(12) United States Patent
Kiyokawa et al.

(10) Patent No.: US 6,482,874 B2
(45) Date of Patent: Nov. 19, 2002

(54) METHOD OF ACCELERATING HARDENING OF THERMOSETTING RESIN AND DEVICE THEREFOR

(76) Inventors: Shin Kiyokawa, 20-2, Benten 4-chome, Soka-shi, Saitama-ken (JP); Taro Kiyokawa, 20-28, Benten 4-chome, Soka-shi, Saitama-ken (JP)

( * ) Notice: Subject to any disclaimer, the term of this patent is extended or adjusted under 35 U.S.C. 154(b) by 49 days.

(21) Appl. No.: 09/755,087

(22) Filed: Jan. 8, 2001

(65) Prior Publication Data

US 2001/0011121 A1 Aug. 2, 2001

(30) Foreign Application Priority Data

Jan. 17, 2000 (JP) ............................ 2000-008112

(51) Int. Cl.$^7$ .................... C08G 59/06; C08G 8/10; C08G 12/32; C08K 3/22; C08K 3/36
(52) U.S. Cl. .................. 523/457; 523/458; 523/466; 524/413; 524/430; 524/431; 524/437; 528/87; 528/129; 528/254; 528/266; 528/271; 528/306
(58) Field of Search ................. 523/457, 458, 523/466; 524/413, 430, 431, 437; 528/87, 129, 254, 266, 271, 306

(56) References Cited

U.S. PATENT DOCUMENTS

| 3,947,617 A | * | 3/1976 | Gerek et al. | ............... | 117/18.21 |
| 3,962,486 A | * | 6/1976 | Gerek et al. | ................... | 427/34 |
| 4,278,961 A | * | 7/1981 | Schroeder et al. | ............. | 338/21 |

FOREIGN PATENT DOCUMENTS

GB          1153529       * 5/1969

OTHER PUBLICATIONS

Broadbent et al., Electrical breakdown strength results from the EU testing program for potential ITER insulation, Advances in Cryogenic Engineering (1997), 42A, pp. 213–218.*

* cited by examiner

*Primary Examiner*—Robert E. L. Sellers
(74) *Attorney, Agent, or Firm*—Rader, Fishman & Grauer PLLC

(57) ABSTRACT

The present invention provides a method of accelerating hardening of thermosetting resin and a device therefor such that hardening time is rendered far shorter than in the case of the prior art. By way of a pertinent means, when unhardened thermosetting resin is to be disposed in an atmosphere having a specified temperature for the purpose of hardening, a ceramic plasma spraying plane is formed in at least one portion, or preferably in as large an area as possible, in the above-mentioned atmosphere whose temperature is maintained at a specified level and in which the above-mentioned resin is disposed, thereby causing convective heat existing in the hot air to be thermally converted into far infrared radiant heat radiation from the ceramic plasma spraying plane mentioned above. The device therefor comprises a retainer for retaining unhardened thermosetting resin inside a furnace in which the above-mentioned thermosetting resin is hardened by maintaining the temperature at a specified level, such that at least one portion of the internal surfaces or the external surfaces of the above-mentioned retainer is used as a plasma spraying plane, which is heated by the convective heat due to the atmospheric temperature inside the furnace, thereby causing far infrared radiation is radiation from the above-mentioned plane.

2 Claims, 6 Drawing Sheets

METHOD OF ACCELERATING HARDENING OF THERMOSETTING RESIN AND DEVICE THEREFOR

BACKGROUND OF THE INVENTION

The invention relates to a method of accelerating hardening of thermosetting resin and a device therefor. More specifically, the invention relates to a method of accelerating hardening of thermosetting resin and a device therefor whereby it is possible, when thermosetting resin is to be hardened, to activate heat rays whose wavelengths are converted to levels which can be easily absorbed by the resin to be heated, such that the resin is uniformly heated.

It is common knowledge that as regards unhardened thermosetting resin, in order to shorten hardening time for purposes like improvement of hardening speed, such measures are taken as adding a hardening accelerator in advance and raising hardening temperature.

Incidentally, in the event that there is a danger of resin performance being affected by the above-mentioned measures, namely, preliminary addition of a hardening accelerator and raising of hardening temperature, then these measures cannot be taken, thus presenting a problem.

For example, high transparency, shape stability, and electrical capability regarding semiconductors are required in the case of epoxy resin for sealing LEDs, since light emitted from light-emitting diodes is radiated through epoxy resin, and therefore there is a limit to measures such as raising hardening temperature and using a hardening accelerator like Class III amine and triphenyl phosphine.

SUMMARY OF THE INVENTION

The object of the present invention, which was made by paying attention to the above-mentioned problem, is to provide a method of accelerating hardening of thermosetting resin and a device therefor whereby hardening time can be rendered much shorter than in the case of the prior art.

The method of accelerating hardening of thermosetting resin as set forth in the invention with the aim of achieving the above-mentioned object is such that when unhardened thermosetting resin is to be disposed in an atmosphere having a specified temperature for the purpose of hardening, a ceramic plasma spraying plane is formed in at least one portion in the above-mentioned atmosphere whose temperature is maintained at a specified level and in which the above-mentioned resin is disposed, thereby causing convective heat existing in the above-mentioned atmosphere having the specified temperature to be thermally converted into far infrared radiant heat radiation from the ceramic plasma spraying plane mentioned above.

As regards the above-mentioned atmosphere having the specified temperature, it is desirable that hot air be circulated by means of a device such as a blower for the purpose of uniforming temperatures. Furthermore, the fact that the above-mentioned resin is disposed in the above-mentioned atmosphere having the specified temperature signifies that the above-mentioned resin is exposed to an atmosphere having a temperature suited for the hardening of the above-mentioned resin. By way of a means for maintaining the temperature of the above-mentioned atmosphere at the specified level, air having an elevated temperature may be circulated between the above-mentioned unhardened thermosetting resin and a heat generator disposed outside or inside a furnace, and moreover, the heating value of the above-mentioned heat generator may be control led such that the temperature of the above-mentioned air is maintained at the specified level. There are no specific restrictions as to the area of the ceramic plasma spraying plane to be disposed around the resin to be hardened, but the larger the area is, the more preferable it is. Furthermore, as regards ceramic plasma spraying, any heretofore used conventional method may be used.

Thermosetting resins that may be applied to the present invention include, for example, not only epoxy resins like bisphenol type epoxy resin but also amino resins such as phenol resin, urea resin, and melamine resin; general-purpose thermosetting resins like unsaturated polyester resin and phthalic acid base resin; and various other thermosetting resins.

There are no specific restrictions as to ceramics that may be used. It is permissible to use quartz based ceramics such as alumina, chromium oxide, and silica sand; various other ceramics including titania; and appropriate mixtures of the above-mentioned ceramics.

There are no specific restrictions as to the grain size of ceramic powder to be subjected to plasma spraying. The preferable grain size depends on types of resins to be hardened. In the case of epoxy resin, it is preferable for the grain size to be between approximately 5 and 11 $\mu$m. Likewise, there are no specific restrictions as to the plasma spray density. The preferable plasma spray density depends on types of resins to be hardened. In the case of epoxy resin, it is preferable for the density to be between approximately 5 and 20 $g/m^2$. There are no specific restrictions as to the basal plate for subjecting ceramic to plasma spraying, but from the viewpoint of factors such as workability and prices, it is preferable to use a metal plate such as an aluminum plate.

Furthermore, the device for acceleration of hardening of thermosetting resin as set forth in the invention with the aim of achieving the above-mentioned object comprises a retainer for retaining unhardened thermosetting resin inside a furnace in which the above-mentioned thermosetting resin is hardened by maintaining the temperature at a specified level. At least one portion of the internal surface or the external surface of the above-mentioned retainer is used as a plasma spraying plane such that the above-mentioned plane is heated by the convective heat due to the atmospheric temperature inside the furnace, thereby causing far infrared radiation is radiated from the above-mentioned plane.

For the purpose of preventing the above-mentioned retainer from blocking the passage of the air that is circulated inside the furnace, it is preferable that a measure be taken such as providing the above-mentioned retainer with a plurality of openings or through holes.

It is stated above that according to the present invention, at least one portion of the retainer is used as the ceramic plasma spraying plane. However, it is permissible to use a portion of the internal wall of the above-mentioned furnace as the ceramic plasma spraying plane.

According to the present invention, it is considered that a ceramic plasma spraying plane is formed around thermosetting resin to be hardened, and that the functioning is such that the greatest possible quantity of wavelengths of heat rays inside the heated atmosphere around the above-mentioned thermosetting resin are converted into wavelengths that are easily absorbed by thermosetting resin. Therefore the functioning of the present invention is entirely different from that of the heretofore known blackening treatment whereby, for example, closely spaced cavities are provided on surfaces of the heat generator.

There are no specific restrictions as to fields of application of the present invention, which may be applied to resin in any field as long as unhardened thermosetting resin is hardened by heating. For example, the present invention may be applied to various fields such as sealing of semiconductors with epoxy resin; coating of semiconductor boards with epoxy resin; and insulation of coils, small coils in particular, of transformers and electric motors; as well as coating and hardening of objects with semi-molded prepolymers that are formed into filmy shapes.

As explained above, according to the method of accelerating hardening of thermosetting resin and the device therefor of the present invention, a ceramic plasma spraying plane is formed in an atmosphere having a temperature capable of hardening thermosetting resin, and therefore the quantity of far infrared radiation containing wavelengths that are easily absorbed by thermosetting resin increases, thus producing the effect of rendering hardening time far shorter than in the case of the prior art.

DETAILED DESCRIPTION OF THE PREFERRED EMBODIMENTS

Figure 1:
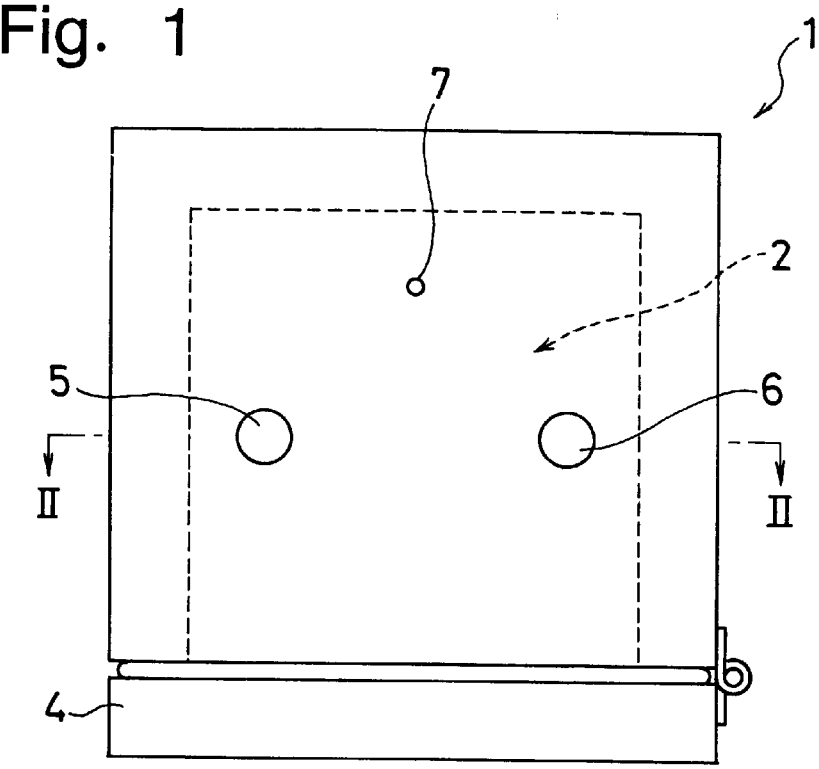
FIG. 1 is a plan view of the device for accelerating hardening of thermosetting resin according to the present invention.
Figure 2:
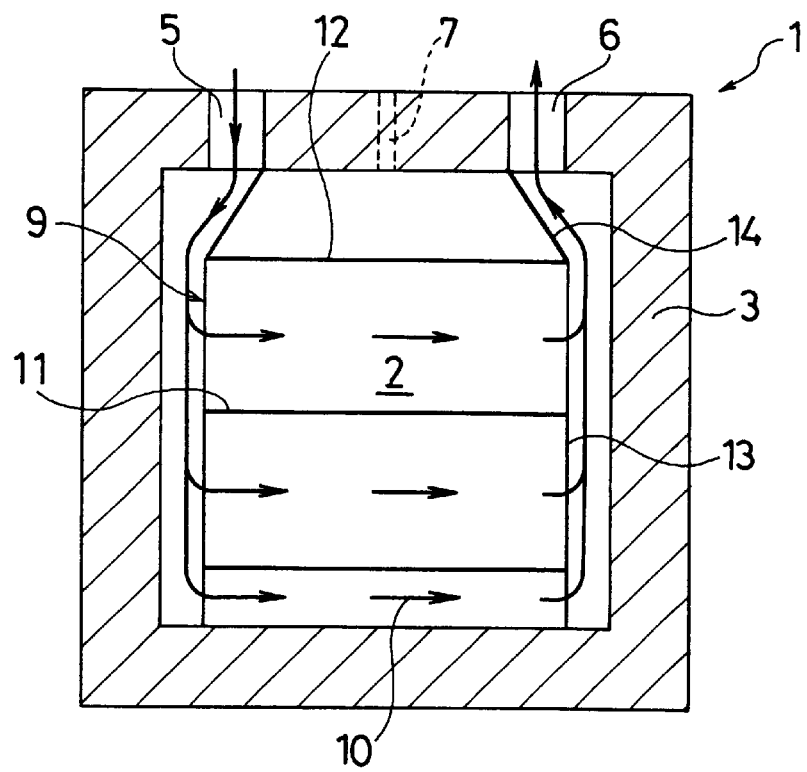
FIG. 2 is a cross-sectional view taken along line 11—11 of FIG. 1.

Reference being had to attached drawings, the present invention will be explained below in specific terms.

The device for accelerating hardening of thermosetting resin according to the first embodiment of the present invention as shown in FIGS. 1 through 5 is a hardening furnace 1 for sealing LEDs with transparent epoxy resin, wherein a furnace chamber 2 is surrounded with a thermal insulation wall 3 and a thermal insulation door 4, and on the upper surface of the hardening furnace 1 are provided a port 5 for introducing hot air, a port 6 for discharging hot air, and a thermometer insertion port 7.

Figure 3:
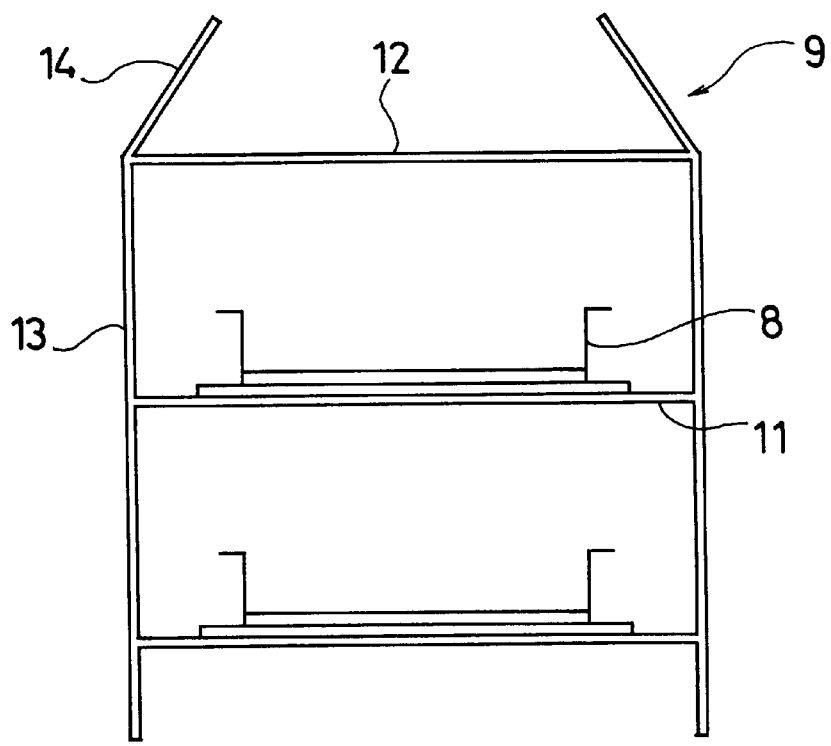
FIG. 3 is an enlarged front view of the retainer illustrated in FIG. 2.

Inside the furnace chamber 2 is disposed a retainer 9 in place which retains a jig 8 (see FIG. 3). The above-mentioned jig 8 serves to dispose unsealed LEDs and unhardened bisphenol type epoxy resin that are placed inside castings (all of which will be explained below with reference had to FIG. 6). Hot air is circulated as shown by an arrow 10 in FIG. 2.

The retainer 9 (see FIGS. 3 through 5) is constructed such that a shelf board 11 and a top board 12, each made of an aluminum plate to both surfaces of which is applied ceramic plasma spraying, are supported by two separately disposed side plates 13; a guide plate 14 serves to prevent hot air from flowing toward the top plate 12; and through holes 15 (see FIG. 5) are provided in side plates, thereby ensuring that the passage of hot air is not blocked. The symbol $7_0$ in FIG. 4 denotes a thermometer insertion hole provided in the retainer 9. The above-mentioned through holes 15 are not essential to the present invention. For example, if the side plates 13 are so disposed as to face the door 4 and the thermal insulation wall $3_0$, in front thereof (see FIG. 1), then it is possible for hot air to pass even if the through holes 15 are not provided. Yet another method is to form a ceramic plasma spraying plane on the internal wall of the hardening furnace 1.

Figure 6:
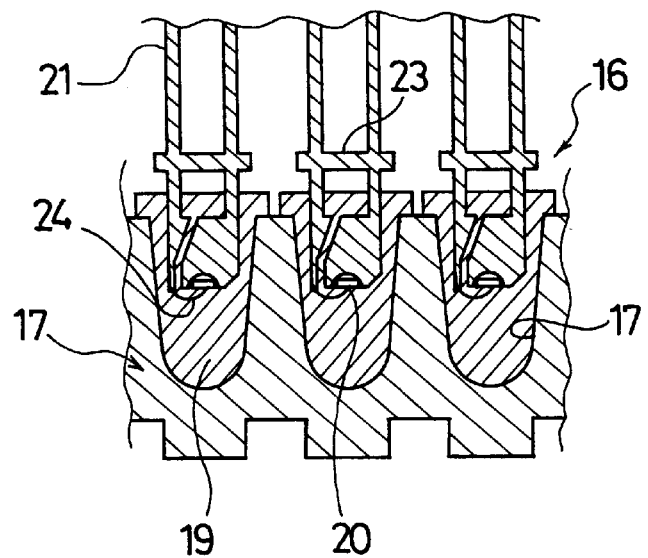
FIG. 6 is a cross-sectional view explaining the means whereby LEDs are sealed with epoxy resin by casting.

With reference had to FIG. 6, an explanation will be made of castings 17 that serve to install LEDs 16 on the jig 8 (see FIG. 3) when epoxy resin is to be hardened. A plurality of castings 17 are normally combined together into a casting block $17_0$ so that a plurality of LEDs may be sealed simultaneously. Furthermore, on the underside of the casting block $17_0$ is provided a cavity 18 for each of the castings 17, thereby permitting the casting block $17_0$, to be positioned properly on the jig 8 (see FIG. 3).

Mold release agent is applied to the interior of the castings 17; into which a specified quantity of unhardened transparent epoxy resin is then injected. Lead frames 21 on which LED chips 20 are installed by soldering or the like are inserted into the castings 17, which, in turn, are fixed on the jig 8 (see FIG. 3). Two conductors 22 are fixed on each of the lead frames 21 by means of a bridge 23, which is cut off after completion of hardening, thus rendering each of the lead frames 21 a completed article. The symbol 24 shown in FIG. 6 denotes a lead wire.

In the next place is shown an embodiment wherein epoxy resin for sealing LEDs is hardened by means of the furnace explained above.

First Embodiment

A test was conducted in which commercial thermosetting resins (bisphenol type epoxy resins) A and B were used; hot air was controlled at 130° C.; and judgment on indices of resin hardening was passed on the basis of glass transition points obtained from measurement performed by means of a differential thermal analysis balance (DSC). Furthermore, by way of an example for comparison purposes, another test was conducted on the above-mentioned thermosetting resins A and B under similar test conditions by using a device which is similar to that explained with reference had to FIGS. 1 through 5 except that ceramic plasma spraying was not performed. The results of the test carried out by way of an example for comparison purposes are shown in Table 1.

TABLE 1

Test results based on conventional method.

| Thermosetting resin | Primary glass transition point | | Secondary glass transition point | |
|---|---|---|---|---|
| | Elapsed time (hours) | Temperature (° C.) | Elapsed time (hours) | Temperature (° C.) |
| A | 2.0 | 84.6 | 3.5 | 97.5 |
| B | 1.0 | 81.7 | 3.0 | 127.0 |

The test results pertaining to the first embodiment are shown in Table 2.

TABLE 2

Test results pertaining to first embodiment

| Thermosetting resin | Sprayed ceramic | Time required for final glass transition point to be reached |
| --- | --- | --- |
| A | Titanium oxide | 1 hour 45 minutes |
| A | Alumina | 1 hour 20 minutes |

Comments on the above-mentioned test results are as follows. In the case of A and B tested by the conventional method (example for comparison purposes), the time required for each test specimen to undergo the whole process including final hardening was 3 hours, since after completion of primary hardening (at which point it was possible to take each test specimen out of the mold without causing deformation), it was necessary to take each test specimen out of the mold for secondary hardening. In contrast to the above, as regards the first embodiment wherein a ceramic plasma spraying plane was formed on the retainer 9, the time required for final glass transition point to be reached was 1 hour 45 minutes in the case of titanium oxide and 1 hour 20 minutes in the case of alumina, This means that with each of the above-mentioned ceramics, the final glass transition point can be reached in a far shorter time than in the case of the prior art; the hardening process can be completed only by primary hardening; and thus productivity can be improved to a vastly superior degree as compared with the prior art. As for the thermosetting resin B, it was likewise confirmed that the hardening process can be completed only by primary hardening.

Figure 7:
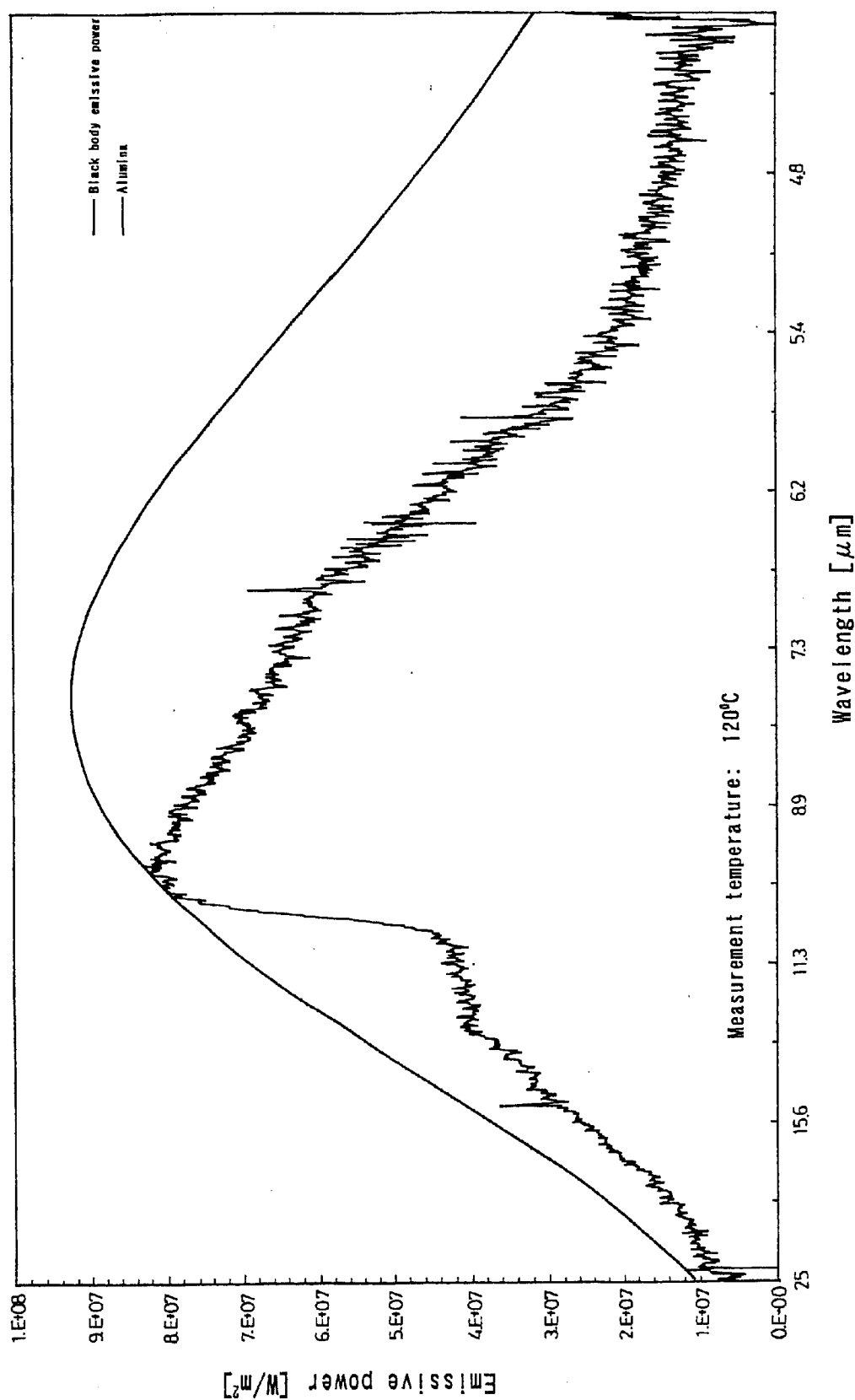
FIG. 7 shows a graph wherein alumna radiation intensities versus wavelengths are compared with black body emissive power versus wavelengths.
Figure 8:
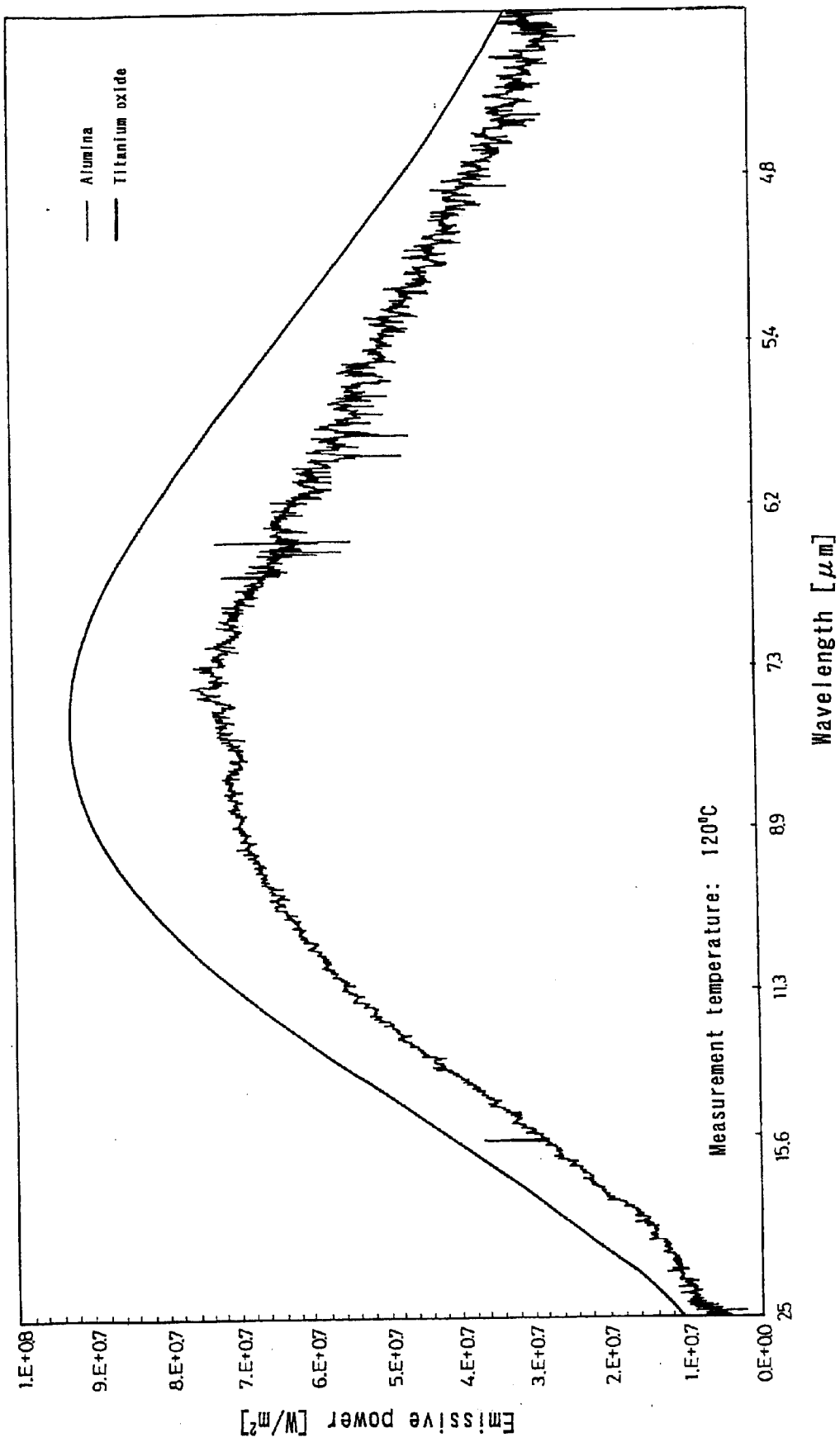
FIG. 8 shows a graph wherein titanium radiation intensities versus wavelengths are compared with black body emissive power versus wavelengths.

As shown in Table 2, the time required for final glass transition point to be reached depends on types of ceramics used. Namely, as shown in FIG. 7, the electromagnetic emissive power of alumina in the neighborhood of a wavelength of 10 $\mu$ at a temperature of 120° C. is nearly in agreement with that of a black body, whereas the electromagnetic emissive power of titanium oxide as shown in FIG. 8 does not have such a peak as in the case of alumina, with the result that the ratio of emissive power of titanium oxide for each wavelength to that of a black body takes on an approximately constant value throughout the wavelength range. Therefore it is possible to vary that wavelength for which emissive power takes on a peak value by changing types of ceramics or by appropriately mixing ceramics having different characteristics. On the basis of the above, it is possible to form a plane for spraying ceramic plasma having far infrared radiation whose wavelengths are easily absorbed by thermosetting resins to be hardened.

Second Embodiment

Hardening times due to ceramic spraying were measured such that a general-purpose epoxy resin having a glass transition point between 110 and 120° C. was used as thermosetting resin and alumina was used as sprays ceramic. The same heating furnace that was used in the test of the first embodiment was used. By way of an example for comparison purposes, a similar heating furnace was used except that ceramic spraying was not performed. Measurement was conducted such that judgment was passed after lapse of each specified heating time span as to whether or not the primary hardening point was reached. The results are shown in Table 3.

TABLE 3

| | Was alumina spraying performed? | Heating time (hours) | Temperature (° C.) | Judgment on primary hardening |
| --- | --- | --- | --- | --- |
| Second embodiment | Yes. | 1.0 | 102 | Hardening completed. |
| | | 2.0 | 120 | Hardening completed. |
| | | 3.5 | 127 | Hardening completed. |
| Example for comparison purposes | No. | 1.0 | 82 | Not hardened. |
| | | 2.0 | 110 | Hardening completed. |
| | | 3.0 | 127 | Hardening completed. |

As can be seen from Table 3, it turned out that in the case of the example for comparison purposes (conventional method), it took 2 hours before it was possible for the test specimen to be taken out of the mold, whereas in the case of the second embodiment, the primary hardening point was reached in 1 hour, at which point it was possible to release the test specimen from the mold.

Figure 4:
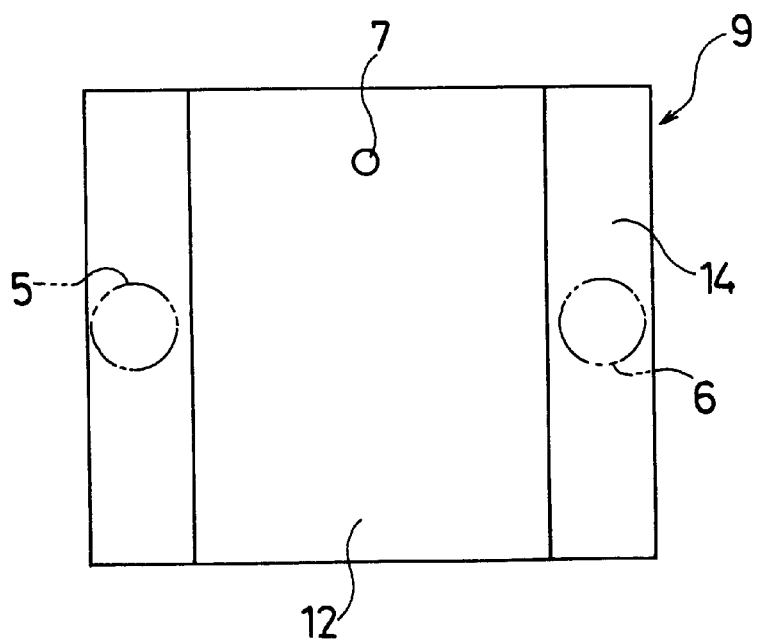
FIG. 4 is a plan view of FIG. 3.
Figure 5:
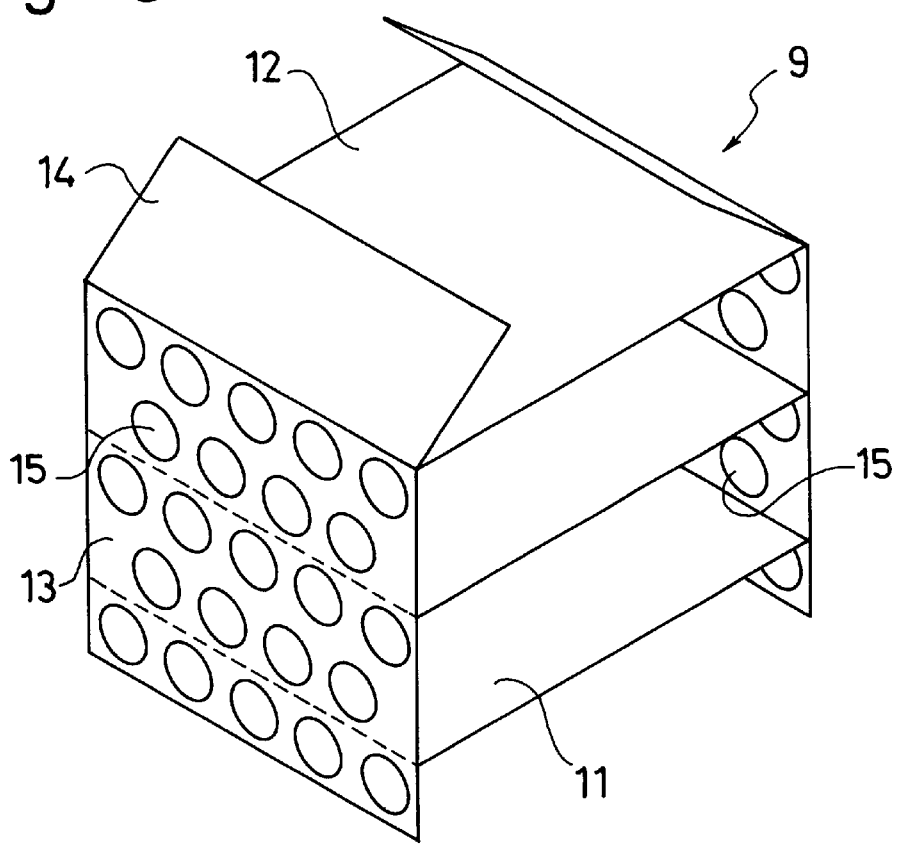
FIG. 5 is a perspective view of the retainer illustrated in FIG. 2.
Figure 9:
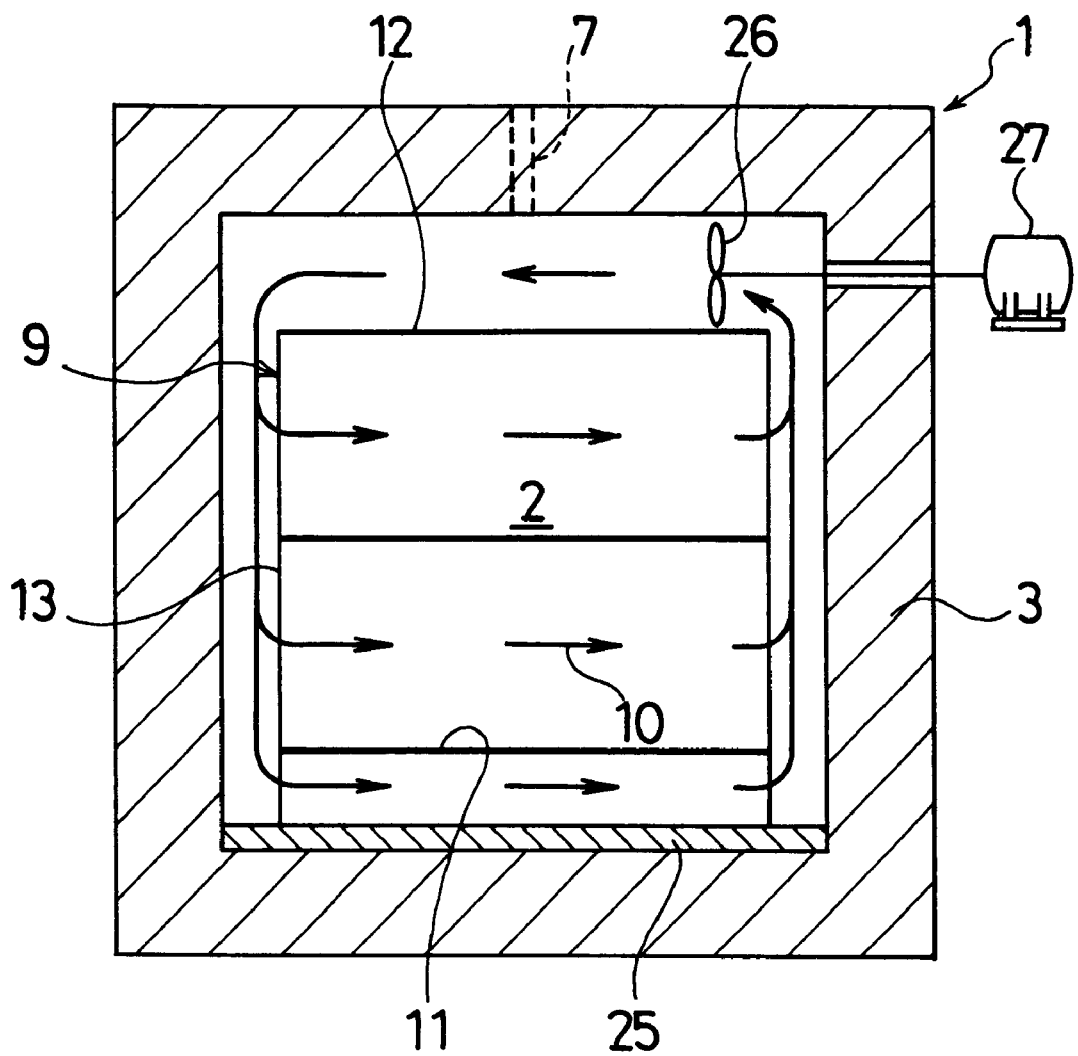
FIG. 9 is a longitudinal cross-sectional view of the device for accelerating hardening of thermosetting resin according to an embodiment of the present invention.

The thermosetting resin hardening acceleration device as shown in FIG. 9 is such that an electric heater 25 is installed on the bottom face of the hardening furnace 1, and a fan 26 is installed between the retainer 9 and the ceiling of the hardening furnace 1, thereby permitting hot air to be circulated inside the furnace. The retainer 9 used in the second embodiment is the same as the retainer 9 as shown in FIGS. 3 through 5 except that the guide plate 14 is omitted. The symbol 27 as shown in FIG. 8 denotes an electric motor that serves to drive the fan 26. Those members which were explained with respect to the first embodiment are denoted by the same symbols and explanations are omitted.

A planar body made of material like carbon fibers was coated with a cohesive phthalic acid base resin prepolymer that had been formed into a filmy shape, and was hardened by using the hardening furnace 1 shown in FIG. 8, with the result that it was possible to increase hardening speed.

What is claimed is:

1. A method of accelerating hardening of thermosetting resin whereby for the purpose of hardening unhardened thermosetting resin disposed in an atmosphere having a specified temperature, a ceramic plasma spraying plane is formed in at least one portion in said atmosphere whose temperature is maintained at the specified level and in which the said resin is disposed, such that the convective heat that exists in the said atmosphere having the specified temperature is thermally converted into far infrared radiant heat radiation from said ceramic plasma spraying plane.

2. A method of accelerating hardening of thermosetting resin according to claim 1, wherein air having an elevated temperature is circulated between said unhardened thermosetting resin and a heat generator, and the heating value of said heat generator is controlled such that the temperature of the above-mentioned air is maintained at the specified level.

* * * * *